Patented Dec. 9, 1941

2,265,941

UNITED STATES PATENT OFFICE 2,265,941

SAPONIFICATION OF RESIN ACIDS

George H. Foster, Stamford, Conn., assignor to American Cyanamid Company, New York, N. Y., a corporation of Maine No Drawing. Application May 17, 1939, Serial No. 274,107

9 Claims. (Cl. 260—105)

This invention relates to the saponification of resin acids such as abietic acid with aqueous solutions of alkalies capable of saponifying the same such as sodium or potassium hydroxide, sodium or potassium carbonate and the like.

In its more specific aspects the invention relates particularly to the production of sizing materials by the saponification of wood or gum rosin or similar materials containing abietic acid or other resin acids or their anhydrides with aqueous solutions of saponifying alkalies such as sodium hydroxide or sodium carbonate solutions.

The production of dry rosin size is usually carried out by adding an aqueous solution of sodium hydroxide or sodium carbonate to molten rosin with vigorous agitation. When a completely saponified rosin size is desired a quantity of sodium hydroxide equal to about 12% of the weight of the resinous material is used as a 40-75% aqueous solution, or a correspondingly greater amount of sodium carbonate may be employed. In some cases a free rosin size containing unsaponified rosin is desired, and in this case correspondingly smaller amounts of alkalies are used.

The customary method employed in saponifying resin acids consists in melting the rosin or other material and adding the saponifying alkali solution with vigorous agitation of the mixture. This method is simple and inexpensive, but difficulties are frequently encountered by reason of thickening or gelation of the batch to a stage where it is so difficult to agitate that complete reaction between the alkali and the resin acids cannot be obtained. This formation of indispersible gels is particularly imminent in the last stage of the process, where most but not all of the saponifying alkali has reacted with the resin acids. In such a case the final product will contain free alkali which is likely to absorb moisture and cause caking in the finished material. The presence of free alkali in admixture with free resin acids also creates a serious hazard of discoloration or spontaneous combustion during storage and shipment of the product.

One of the principal objects of the present invention is the provision of a method of saponifying resin acids with alkaline solutions in which the formation of indispersible gels is substantially avoided and substantially complete neutralization of the saponifying alkali is obtained. I have found that the phenomenon of gel formation is a function of the water content of the mixture of resin acids and alkali in the saponification kettle, which, in turn, is dependent upon the temperature of the reaction mixture and the rate at which the saponifying alkali solution is added. I have also found, as a principal feature of the invention, that there is a definite limit of moisture content below which substantial gel formation is avoided, and that difficulties due to gelation can be overcome by maintaining the moisture content of the batch below this limit at all times.

The problem of gelation is also intimately related to the ratio of saponified to unsaponified resin acids in the reaction mixture, as is shown by the fact that extensive gel formation is usually encountered only during the last stages of the reaction when the amount of saponified acid is high and the amount of unsaponified and unsaponifiable material in the batch is relatively low. Thus, for example, in the manufacture of dry rosin size it is customary to saponify wood or gum rosin which consists of about 91% resin acids and 9% unsaponifiable matter, and in this process there is usually no trouble from gel formation until after about 85% of the rosin acids have been saponified. While I have found that gel formation during the last stages of the cook is initiated by excessive moisture content, and probably in localized areas of the batch, it is probable that the subsequent thickening of the batch is due to the scarcity of unsaponified material present. It is another object of the invention to carry out at least the last stages of the reaction in the presence of substantial quantities of an unsaponifiable diluent which is soluble in the resin acids and compatible with the soaps thereof, as I have found that such a diluent will reduce the tendency of the batch to set up under the influence of any gel that may be formed.

The process of my invention therefore involves the saponification of resin acids with alkaline solutions under conditions such that the water content of the reaction mixture is maintained at all times below a certain figure, above which extensive gel formation may be encountered. In the saponification of wood and gum rosin this figure represents a moisture content of about 5% of the weight of the batch; i. e., the batch should not contain more than 5% of moisture at any time during the cook. This is also true for abietic acid and other similar resin acids which give rise to gel formation. It is also desirable that localized areas in the batch should not contain much more than 5% of moisture, but this condition is not absolutely essential in practicing the invention and is, in fact, very difficult to attain unless very concentrated solutions of alkalies are employed. When the moisture content of the batch is maintained well below 5% and a dilute solution of alkali is added the formation of a small amount of gel can sometimes be noted in the area where the saponifying alkali solution is poured in, but this gel is easily dispersed by rapid agitation of the batch.

The water content of the mixture undergoing saponification is most easily maintained at a low figure by first heating the rosin or other material to temperatures sufficiently high to insure rapid volatilization of water therefrom and then adding the saponifying alkali solution at a rate not substantially greater than the rate of water evolution. I have found that temperatures of 150–180° C. are most suitable for this purpose. It should be noted that water may be present in the batch from at least two sources, first the relatively large quantity of water constituting a part of the saponifying alkali solution and secondly the small quantity of chemical water formed by reaction between the caustic and the organic carboxylic acids. The alkali solution is preferably preheated and should be added so slowly that the water from these two sources is volatilized at least as fast as the rate of water addition and formation in the reaction mixture. When this is done the formation of substantial quantities of indispersible gels is inhibited.

While the process of the invention, including the addition of unsaponifiable diluents prior to the completion thereof, is suitable for the production of resin acid soaps in any form it is particularly advantageous in operations in which the reaction product is to be maintained in liquid form at elevated temperatures for substantial periods of time. This condition occurs, for example, when the liquid product is to be passed over or between chilled rollers or otherwise solidified in films so that a flaked product is obtained. Under these conditions the addition of an unsaponifiable diluent such as d-limonene (B. P. 175° C.), dipentene (B. P. 175° C.), terpinenes (B. P. 173–181° C.), pinenes (B. P. 155–163° C.) and the like, which are soluble in the resin acids and compatible with their soaps, is particularly valuable, for it also produces a more fluid size and permits flaking at lower temperatures. Even without the diluent, however, a rosin size of such low moisture content as is obtained by the process of my invention can be maintained in a molten condition for long periods of time without danger of gelation and thickening of the batch.

In the foregoing description the invention has been referred to in terms of batch processes, but its principles are by no means limited to this method of operating. On the contrary, these features are of equal if not greater utility in continuous saponification processes, in which resin acids and alkali solutions are continuously or intermittently added and mixed in one part of a reaction system while the finished soap is withdrawn from another part. Such continuous processes require the maintenance of reaction mixtures containing more than 85% of the rosin acids in saponified form at high temperatures for relatively long periods of time, and therefore involve the conditions under which extensive gel formation is most likely to occur. By suitably controlling the temperature and rate of alkali addition the moisture content of the soap can be maintained at all times below 5%, and thus the formation of indispersible gels is inhibited.

The invention will be illustrated in greater detail by the following specific examples. It should be understood, however, that although these examples describe some of the more limited aspects of the invention they are given primarily for purposes of illustration and that the invention in its broader aspects is not limited thereto.

*Example 1*

800 parts of N-wood rosin were melted and maintained at substantially 165° C. 80 parts of solid technical caustic soda were dissolved in water to make a 75% solution at 165° C. The caustic solution was then added uniformly to the melted rosin with stirring over a period of ten minutes. This rate of caustic addition was sufficient to avoid the formation of undesirable quantities of indispersible gel, and to maintain the total water content of the reacting mixture below 5%. This reacted mass was held at the reacting temperature for a test period of fifteen minutes without any undesirable gel formation. At the end of that time, the liquid reaction product was flowed from the vessel between two water-cooled steel rolls while the latter were being rotated, the temperature of the rolls and the speed of rotating being such that adequate solidification of the product would take place while in contact with the rolls. A doctor blade was provided to remove the solidified flake. Flaking continued for approximately ten minutes during which time half of the reaction product was disposed of. To the remaining quantity in the reaction vessel, 400 parts of N-wood rosin at a temperature of 165° C. were added and 40 parts of caustic as a 75% aqueous solution at 165° C. were slowly introduced over a period of five minutes, while permitting the water to escape so that the content thereof was always below 5%. The reaction product was maintained in the kettle with agitation for another test period of fifteen minutes. During this time, no undesirable gel formation was observed. Flaking was then begun as before, flaking one-half of the total quantity of reaction product. At that point, another 400 parts of N-wood rosin at 165° C. were added to the kettle and 40 parts of caustic as a 75% aqueous solution at the same temperature as before, the rate of alkali addition being such that the total water content of the reaction mixture was maintained below 5%. After the caustic was all added, the batch was again held for a period of substantially fifteen minutes without the formation of undesirable quantities of gel. Flaking was then begun and in twenty minutes the entire batch had been satisfactorily flaked.

The entire operation took substantially 2½ hours and during this time the rosin size itself had been held in a liquid condition for nearly two hours without any sign of setting up or undesirable quantities of gel.

The flakes themselves were of excellent appearance, golden yellow and from ⅛ to ½ inch in largest dimension. The solubility of the flaked size was excellent, a 20% solution being reasonably clear at 80° C. and a 5% solution being absolutely clear at room temperature. Due to the fact that the caustic used was 10% of the weight of the rosin, the product contained substantially from 25 to 30% free rosin.

*Example 2*

In this case, the total caustic used was substantially 14% of the weight of the N-wood rosin, added to the melted rosin as a 75% solution at the same temperature as above. The rate of addition of the caustic solution was slow enough to prevent the total quantity of water present in the reaction mixture from rising above 4%. The caustic addition period and a test holding period after the caustic addition amounted to approximately 45 minutes. During this time, no undesirable quantities of indispersible gel was noted. The liquid reaction product was then flaked as in Example 1 except that the entire batch was flaked continuously. The two products were substantially the same except that the one of this example contained substantially no free rosin due to the larger quantity of caustic.

Example 3

This was a batch type of run using G-gum rosin. The caustic soda used was 10% of the weight of the rosin and was added as a 75% solution. The caustic and rosin were combined as above, the caustic solution being added uniformly over a twenty minute period so as to maintain the water content of the reaction mixture below 5%. Following the caustic addition, the batch was held for a test period of thirty minutes, while stirring, without the formation of any undesirable quantities of indispersible gel. It was observed in this example that the molten size was somewhat more viscous than when N-wood rosin was used and that the reaction started more slowly.

Example 4

At this point, it was desired to vary the rate of addition of the caustic solution so that the water content of the reaction mixture would rise above 5%. The 14% of caustic and rosin were reacted under the conditions of Example 3 above, up to the time that caustic equivalent to 10% by weight of the rosin had been added slowly, so as to prevent the quantity of water in the reaction product from rising above 5%. No trouble was experienced and no undesirable quantities of indispersible gel were formed. The remaining quantity of caustic was added to the reaction product quickly, with the result that the fusion became so viscous that further agitation was impossible, due to the formation of undesirable quantities of indispersible gel.

Example 5

This run was a repetition of Example 4 except that after adding caustic equivalent to 10% of the rosin, an addition of 2% of dipentene was made before the remaining quantity of caustic was added. Upon adding the remainder of the caustic as in Example 4, no difficulty was experienced due to the fact that the unsaponifiable dipentene acted as a diluent and made the otherwise undesirable gel dispersible. In this case, the total caustic was added over a period of forty minutes and the fusion stirred for thirty minutes and then flaked. The flakes were eminently satisfactory, easily dissolving to a hot 20% solution which remained water clear on dilution to 4%. Due the fact that G-rosin had been used as a starting material, the color of the solution was considerably darker than that of Example 1 for instance.

Example 6

This was a repetition of Example 5 without resorting, however, to the use of dipentene but adding the entire quantity of caustic slowly so as to maintain the total water content of the reaction mixture well below 5% and over a period longer than in Example 5. No undesirable quantities of indispersible gel were noted. The flake product was satisfactory.

The behavior of N-wood rosin appears to be somewhat different from G-gum rosin in that it reacts more readily and forms a less viscous molten product. Since their acid numbers are not greatly different, the variation must arise more from the differences in the nature of the components or in their relative proportions rather than from their aggregate amounts. Consequently, the invention is not to be restricted to the examples given, which are merely illustrative but various modifications may be practiced, the details of procedure being dependent, of course, upon the materials used.

What I claim is:

1. A method of saponifying resin acids with alkaline solutions while avoiding gel formation which comprises heating said acids to temperatures above the melting point thereof, slowly adding thereto an aqueous solution of a saponifying alkali while evaporating water from the reacting mixture at a rate not less than the combined rate of water addition and water formation in the mixture.

2. A method of saponifying resin acids with alkaline solutions while avoiding gel formation which comprises heating said acids to temperatures above the melting point thereof and sufficiently high to ensure rapid volatilization of water therefrom and adding thereto an aqueous solution of a saponifying alkali at a rate such that the water content of the reaction mixture does not exceed 5% at any time.

3. A method of saponifying resin acids with alkaline solutions while avoiding gel formation which comprises heating said acids to temperatures well above the melting point thereof, slowly adding thereto an aqueous solution of a saponifying alkali while agitating the mixture, evaporating water from the reaction mixture at a rate not less than the combined rate of water addition and water formation in the mixture, and also adding as a diluent a terpene which boils above about 155° C. before completing the alkali addition.

4. A method of saponifying acids of rosin with alkaline solutions while avoiding gel formation which comprises heating said acids to temperatures above the melting point thereof, slowly adding thereto an aqueous solution of a saponifying alkali while evaporating water from the reacting mixture at a rate not less than the combined rate of water addition and water formation in the mixture.

5. A method of saponifying the acids of rosin with alkaline solutions while avoiding gel formation which comprises melting said rosin and maintaining it in molten condition at temperatures sufficiently high to ensure the rapid volatilization of water therefrom and adding thereto an aqueous solution of a saponifying alkali at a rate such that the water content of the reaction mixture does not exceed 5% at any time.

6. A method of saponifying the acids of rosin with alkaline solutions while avoiding gel formation which comprises adding an aqueous solution of a saponifying alkali to molten rosin at temperatures not substantially lower than 150° C. and at a rate such that the water content of the reaction mixture does not exceed 5% at any time.

7. A method of saponifying the saponifiable matter in rosin which includes the step of heating the same to 165° C., adding thereto a 75% solution of caustic soda at substantially 165° C., the rate of caustic soda addition being such that the water content does not exceed 5% at any time, whereby the formation of a gel indispersible in the reaction mixture is avoided, withdrawing a portion of the liquid reaction product and solidifying the same by cooling and adding to the remaining reaction product in the reaction vessel additional quantities of molten rosin and heated alkali in substantially the same proportions and repeating the cycle.

8. A method of saponifying the acids of rosin with alkaline solutions while avoiding gel formation which comprises continuously mixing molten rosin preheated to at least 150° C. with an aqueous solution of a saponifying alkali at a rate such that the water content of the mixture does not exceed 5% at any time, agitating the mixture at temperature of at least 150° C. until substantially all the alkali has reacted with the rosin acids, and continuously withdrawing finished resin acid soap from the system.

9. A method of preparing a dry rosin size which comprises heating acids of rosin to temperatures well above the melting point thereof, slowly adding thereto an aqueous solution of a saponifying alkali while evaporating water from the reaction mixture at a rate not less than the combined rate of water addition and water formation in the mixture, agitating the mixture at elevated temperatures above the solidification point thereof until substantially all the alkali has reacted with the rosin acids and a product containing less than 5% of water is obtained, and rapidly cooling the product in flaked form by passing it in thin films over an artificially cooled moving surface.

GEORGE H. FOSTER.